United States Patent
Panelli et al.

(10) Patent No.: US 7,252,292 B2
(45) Date of Patent: Aug. 7, 2007

(54) OIL RING FOR AN INTERNAL COMBUSTION ENGINE

(75) Inventors: Renato Panelli, Sao Paulo (BR); André Ferrarese, Sao Paulo (BR)

(73) Assignee: Mahle Components de Motores do Brasil LTDA, Itajuba-MG (BR)

( * ) Notice: Subject to any disclaimer, the term of this patent is extended or adjusted under 35 U.S.C. 154(b) by 167 days.

(21) Appl. No.: 10/479,372

(22) PCT Filed: May 29, 2002

(86) PCT No.: PCT/BR02/00076

§ 371 (c)(1),
(2), (4) Date: Dec. 1, 2003

(87) PCT Pub. No.: WO02/097310

PCT Pub. Date: Dec. 5, 2002

(65) Prior Publication Data

US 2004/0232623 A1    Nov. 25, 2004

(30) Foreign Application Priority Data

May 30, 2001 (BR) .................................. 0102824
May 27, 2002 (BR) .................................. 0202271

(51) Int. Cl.
*F16J 9/12* (2006.01)
*F16J 9/06* (2006.01)
*F02F 5/00* (2006.01)

(52) U.S. Cl. ............... 277/472; 277/464; 277/465; 277/442

(58) Field of Classification Search ............... 277/442, 277/459, 460, 464, 465, 472, 434
See application file for complete search history.

(56) References Cited

U.S. PATENT DOCUMENTS

| | | | | | |
|---|---|---|---|---|---|
| 1,327,801 | A | * | 1/1920 | Blache | 277/543 |
| 2,291,945 | A | | 8/1942 | Bowers | |
| 2,346,897 | A | * | 4/1944 | Bowers | 277/472 |
| 2,452,503 | A | * | 10/1948 | Teetor | 277/463 |
| 2,511,874 | A | * | 6/1950 | Phillips | 277/444 |

(Continued)

FOREIGN PATENT DOCUMENTS

DE    8503197    11/1985

(Continued)

*Primary Examiner*—Alison K. Pickard
(74) *Attorney, Agent, or Firm*—Darby Darby

(57) ABSTRACT

An oil ring for an internal combustion engine, comprising a metallic annular body (10) to be mounted around a piston (P) reciprocating inside a cylinder (C) of the engine, said annular body (10) having opposite lateral faces (11), an internal face (12) onto which will be seated a resilient expander (M), and an external contact face (13) to be seated against the internal face of the cylinder (C) and having a height (h) that is substantially smaller than the height (H) of the internal face (12). Each lateral face (11) is defined by one or more lateral face portions (11a, 11b), which are designed to reduce the moment of inertia of the annular body (10), giving higher conformability to the latter. Preferentially, but not exclusively, the annular body (10) can be further provided with channels (15, 16), extended along at least part of the ring hight and which are radially spaced back in relation to the external contact face (13).

24 Claims, 3 Drawing Sheets

U.S. PATENT DOCUMENTS

| | | | | |
|---|---|---|---|---|
| 2,657,962 A | * | 11/1953 | Robinson | 277/463 |
| 2,754,165 A | * | 7/1956 | Quade | 277/488 |
| 2,848,288 A | * | 8/1958 | Johnson | 277/463 |
| 3,241,219 A | * | 3/1966 | Hamm | 29/888.076 |
| 3,326,561 A | * | 6/1967 | Braendel | 277/472 |
| 3,822,973 A | * | 7/1974 | Prasse et al. | 277/357 |
| 4,099,730 A | * | 7/1978 | Nisper | 277/484 |
| 4,452,464 A | * | 6/1984 | Furuhama | 277/457 |
| 4,629,200 A | * | 12/1986 | Ruddy | 277/463 |
| 4,669,369 A | * | 6/1987 | Holt et al. | 92/160 |
| 5,295,696 A | * | 3/1994 | Harayama et al. | 277/443 |
| 5,788,246 A | * | 8/1998 | Kuribayashi et al. | 277/463 |
| 6,793,222 B2 | * | 9/2004 | Katsaounis et al. | 277/459 |

FOREIGN PATENT DOCUMENTS

| | | | |
|---|---|---|---|
| DE | 3606011 A1 | | 9/1987 |
| DE | 3833322 A1 | | 12/1989 |
| DE | 19755425 A1 | | 6/1999 |
| DE | 198 08 483 A1 | * | 9/1999 |
| EP | 0544459 A1 | | 6/1993 |

* cited by examiner

OIL RING FOR AN INTERNAL COMBUSTION ENGINE

This is a U.S. national phase application under 35 U.S.C. § 371 of International Patent Application No. PCT/BR2002/000076, filed May 29, 2002 which claims the benefit of Brazilian Application No. PI 0102824-3, filed May 30, 2001 and Brazilian Application No. PI 0202271-0, filed May 27, 2002. The International Application was published on Dec. 5, 2002 as International Publication No. WO/2002/097310 under PCT Article 21(2) the content of all the applications are incorporated herein in their entirety.

FIELD OF THE INVENTION

The present invention refers to an oil flow control ring for the piston of internal combustion engines, said ring having optimized specific pressure and high conformability.

BACKGROUND OF THE INVENTION

Until the 1920's, practically all the internal combustion engines used only compression rings. Engine rotations were low and the compression rings were sufficient to control the small amounts of oil sent by the connecting rods to the cylinder walls.

With the use of higher rotation rate engines and the introduction of the pressurized lubrication system, the use of a specific ring was required to control the large amounts of oil sent against the cylinder walls. At that time, a ring named oil flow controller was developed. Such ring is characterized by having, on the external face thereof, two contact surfaces with the cylinder wall, which are separated by a channel containing radial slots for oil flow drainage. To increase the tangential load and ring conformability, a spring housing has been added to the internal face. From that time on, there has not been a great evolution in the basic shape, except for the rings with the external contact face presenting a conical profile for better control of the lubricant oil consumption during the break-in period of the engine.

The oil flow control ring must present two main functional characteristics: scraping the oil from the cylinder wall towards the crankcase of the engine, and maintaining a sufficient amount of oil to the compression rings above them, so that the oil film is maintained between the rings and the cylinders all the time.

The efficiency with which an oil flow control ring performs such functions results from the following factors: capacity of rapidly seating on the cylinder; the geometry of the contact face; the pressure against the cylinder walls; the dynamics of oil removal and drainage; and the ability to rapidly conform to the variations of the cylinder profile.

Nevertheless, the known prior art technology has limitations as to the optimization of friction losses and oil consumption.

It has been found that nearly 25% of friction losses of an engine are due to the rings, and 70% of said losses come from the oil ring under operation, mainly due to its high tangential load. Thus, any study relating the friction reduction in a set of piston rings should be started by the oil flow control ring.

The tangential load is directly related to the formula of the specific pressure that the ring contact face exerts against the cylinder wall. This pressure is one of the main parameters of oil flow control and is expressed by:

$$P_0 = \frac{2 \cdot Ft}{d1 \cdot c} \quad (1)$$

$P_0$ = specific pressure
$Ft$ = tangential load
$d1$ = nominal diameter of the ring
$c$ = dimension of the ring contact face with the cylinder Experiments and literature show that the lower the specific pressure the higher will be the oil consumption. Thus, in order to maintain the same oil control conditions and reduce the friction loss by reducing the tangential load, a dimension reduction in the ring contact face with the cylinder is required to maintain the same specific pressure.

For example, considering an oil flow control ring with a coil spring (in a Diesel engine) and with a 102.0 mm nominal diameter, there is the following variation of the specific pressure as a function of the usual manufacturing tolerances:

$d1 = 102.0$ mm
$Ft = 54 + 40\%$ N
$h = c/2 = 0.40 \pm 0.10$ mm
$Ft$ min. $= 54$ N          $Ft$ max. $= 76$ mm
$h$ min. $= 0.30$ mm        $h$ max. $= 0.50$ mm From formula (1) above there would be:
$P_0$ min.$=1.06$ N/mm$^2$
$P_0$ max.$=2.48$ N/mm$^2$ which would give a variation of about 134% from the minimum value. As a function of this considerable difference in the specific pressure, a series of tests in dynamometer were performed, using oil flow control rings under the minimum specific pressure conditions, as compared to rings with maximum specific pressure, in order to study the performance of the engine in these two extremes (see table 1).

TABLE 1

| Diesel engine - 4 cyl., 60 kw - 3000 r.p.m | | |
|---|---|---|
|  | $P_0 = 1.06$ N/mm$^2$ | $P_0 = 2.48$ N/mm$^2$ |
| Lubricant oil consumption | 0.57 | 0.26 |
| Friction loss Wilan's lines (kW) | 19.8 | 21.1 |

These results showed a large variation on engine's performance, mainly relating to oil consumption, partially caused by the dimensional tolerance of the contact surface. It should be noted that, by increasing the specific pressure, the consumption was reduced to half, but generating the undesired higher friction effect.

In addition to specific pressure, ring conformability is one of the most significant characteristics for oil flow control.

Ring conformability is a parameter that indicates the better or worse capacity of the ring to adapt to the possible deformations or diametral variations of the cylinder, thus maintaining its scraping and sealing capacity. The ring conformability is represented by the conformability factor that is expressed by the following mathematical relation:

$$k = \frac{Ft \cdot (d1 - r1)^2}{4 \cdot E \cdot I}$$

k=conformability factor
Ft=tangential load
d1=nominal diameter of the ring
r1=ring radial wall thickness
E=modulus of elasticity
I=moment of inertia The example below illustrates the conformability calculation presented herein:

By using mean dimensional values of an Otto cycle ring with a 67.1 mm diameter:

Ft=36.0 N
d1=67.1 mm
r1=2.23 mm
E=160 GPa
I=0.34

The higher the k factor, the higher will be the capacity of the ring to adapt to cylinder deformations and better will be the oil flow control. Since it is not desirable to increase the tangential load due to the increase of friction losses, only the modulus of elasticity and the geometrical shape of the ring remain available to improve the conformability.

OBJECTS OF THE INVENTION

The general object of the present invention is to provide an oil ring for internal combustion engines having high conformability and optimized specific pressure to provide high oil scraping efficiency without increasing the friction losses.

A further object of the invention is to provide an oil ring such as cited above that presents adequate drainage dynamics of the scraped oil.

Still a further object of the invention is to provide an oil ring such as cited above that can be made with minimum manufacturing operations.

SUMMARY OF THE INVENTION

As mentioned above, the invention refers to an oil ring for internal combustion engines comprising an annular body to be mounted around a piston that reciprocates inside a cylinder of the engine.

As known, the annular body has opposite lateral faces, an internal face, defining a support onto which will be seated a resilient expander generally in the form of a metallic spring, and an external contact face to be seated against the internal face of the cylinder. According to the invention, the external contact face is defined by a single continuous surface extension of the annular body presenting, in the axial direction, a height that is substantially smaller than the height of the internal face, each lateral face being defined by at least one lateral face portion that is designed to reduce the moment of inertia of the annular body towards its axis and its center of mass.

The construction proposed by the invention not only allows for the reduction of the total height of the ring, as it uses only one external contact face, but also the reduction of friction, by reducing the tangential load, without causing damages to the specific pressure that is required for a desired scraping efficiency, since the contact face is conveniently correspondingly reduced.

BRIEF DESCRIPTION OF THE DRAWINGS

The invention will be described below, with reference to the appended drawings, in which.

DETAILED DESCRIPTION OF THE ILLUSTRATED EMBODIMENTS

Figure 1:
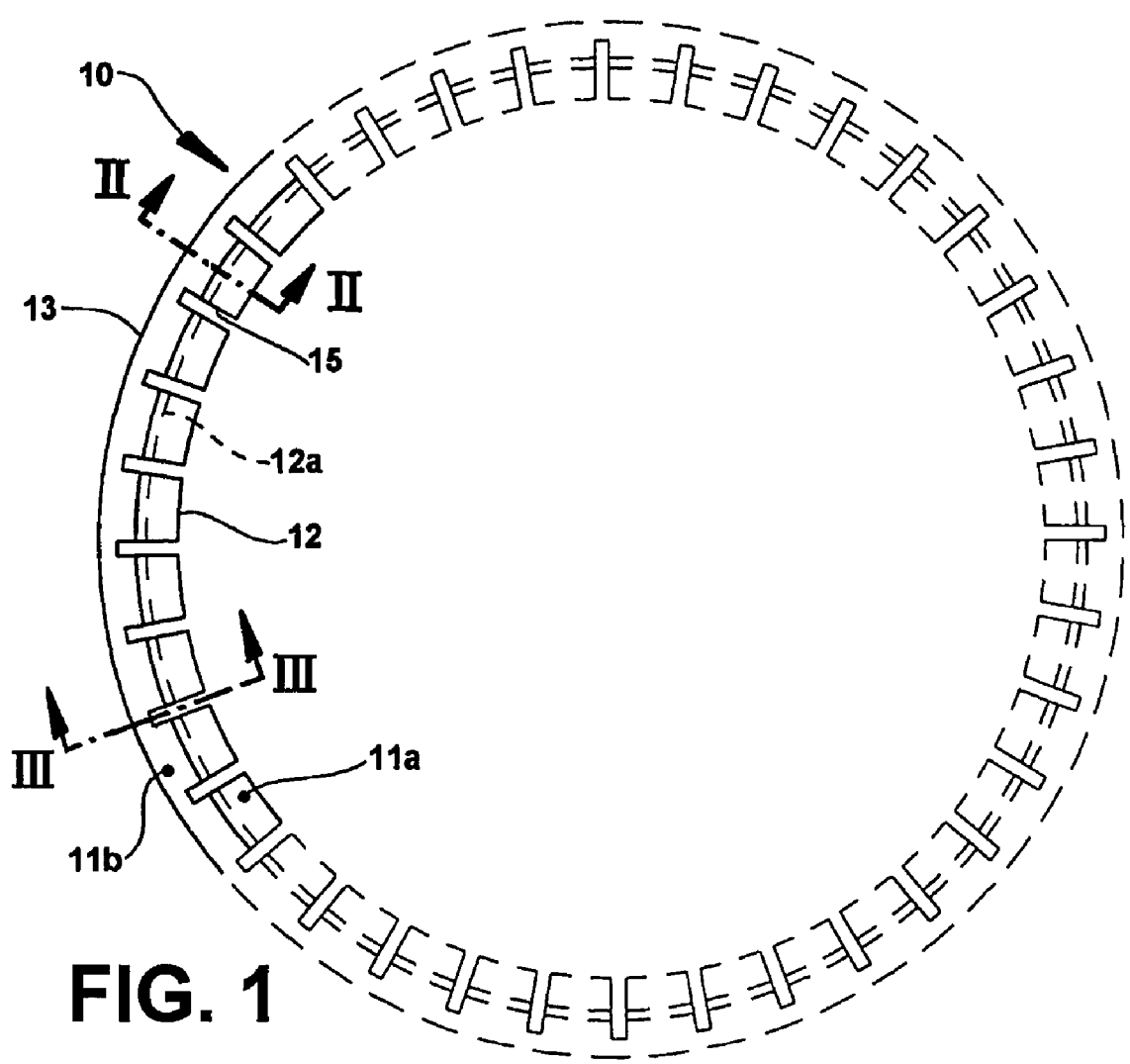
FIG. 1 is a partial plan view of the oil ring of the present invention, according to a first embodiment.

As illustrated, the oil ring object of the present invention is made of steel, cast iron, another metal alloy, polymeric material or any other suitable material, comprising an annular body 10 to be mounted to a respective groove of a piston P designed to reciprocate inside a cylinder C of the internal combustion engine.

The annular body 10 has a pair of end faces 11, which are opposite and generally parallel to each other and orthogonal to the axial axis of the ring, an internal face 12, and an external contact face 13 to be seated against the internal face of the cylinder C, in order to scrape the lubricant oil that is conducted to this region upon operation of the engine. The internal face 12 of the annular body 10 defines a support, generally in the form of a groove 12*a*, for example having a "V" or "U" profile or combinations of these shapes, onto which will be seated a resilient expander "M" generally defined by a metallic spring that is dimensioned to exert a determined expanding radial force against the annular body 10.

According to the invention, the external contact face 13 is defined by a single continuous surface extension of the annular body 10 presenting, in the axial direction, a height h that is substantially smaller than the height H of the internal face 12. Preferably, the height h of the external contact face 13 is at maximum about half the height H of the internal face 12, so as to allow a corresponding reduction of the tangential load Ft that is necessary to maintain the desired specific pressure "$P_0$" of the external contact face 13 against the cylinder C.

The construction proposed herein allows the manufacture of a narrower external contact face with reduced dimensional tolerance in relation to the prior art, minimizing the variation of the specific pressure $P_0$ and improving the oil flow control. By maintaining only one contact surface on the external contact face 13 the specific pressure variations occurring nowadays in the oil rings with two contact surfaces is reduced to half. From the data of the example given above, the embodiment proposed herein has the following specific pressure variation:

d1 = 102.0 mm
Ft = 54 + 40% (N)
h = c = 0.8 ± 0.10 (mm)
Ft min. = 54 N          Ft max. = 76 N
h min. = 0.7 mm         h max. = 0.9 mm From formula (1) above there would be:

$P_0$ min.=1.18 N/mm$^2$ $P_0$ max.=2.13 N/mm$^2$

As it can be observed from the example above, the new constructive solution conducts to a specific pressure variation of about 80% versus 134% of the presently known construction.

In addition to the dimensional aspect mentioned above, the annular body 10 has its lateral faces 11 (or at least one of them) configured to reduce the moment of inertia of the annular body 10 towards its axial axis and its center of mass, imparting higher conformability to the ring.

In the illustrated embodiments, each lateral face 11 of the annular body 10 is defined by a first lateral face portion 11a, which is orthogonal to the axial axis of the annular body 10 and maintains the height of the latter equal to the height H of the internal face 12, and the first lateral face portions 11a of both lateral faces 11 are consequently parallel to each other. Each lateral face 11 further comprises a second lateral face portion 11b, radially outwardly extending from the first lateral face portion 11a towards the adjacent edge of the external contact face 13 of the annular body 10. Still according to the illustrated embodiments, both second lateral face portions 11b are mutually convergent towards the external contact face 13.

While the drawings illustrate only one constructive form of the lateral faces 11, it should be understood that they may present other configurations. For example, only one of the lateral faces 11 can be defined by two distinct lateral face portions. One of said lateral faces 11 would be integrally defined by a first lateral face portion 11a, while the other lateral face 11 would be partially defined by a first lateral face portion 11a and completed by a second lateral face portion 11b designed to reduce the height of the annular body 10 towards the external contact face 13. In a possible alternative construction, said other lateral face 11 would be integrally defined by a second lateral face portion 11b extending from the internal face 12 up to the external contact face 13 and producing the necessary reduction in the height of the annular body 10.

It should be further understood that other geometrical shapes could be used, provided that they result in the same effect in terms of conformability factor. For example, we can compare the same Otto oil ring with a diameter of 67.1 mm used in the previous conformability calculation:

Ft=36.0 N d1=67.1 mm r1=2.23 mm

E=160 GPa

I=0.241 mm$^4$

K=0.98 (188% better)

Thus, in relation to the present technique, the ring geometry improves the capacity of the ring to adapt to cylinder deformations, consequently improving oil flow control.

The construction of the present invention makes possible to induce torsion of the ring when confined. Such action can be useful as an aid to control consumption of lubricant oil and cannot be applied to normal oil rings, since their contact faces have two contact surfaces and the torsion would impair the contact of one of said faces, consequently impairing the performance of the ring functions. Also, by having the contact surface as the only constructive element of its external contact face, as opposed to the prior art that requires the presence of two contact surfaces and a recess, the innovation easily permits to obtain rings with a smaller height than that of the prior art. Thus, there is provided an increase in ring conformability, concomitantly with weight reduction of the pistons and the resulting benefits.

Figure 3:
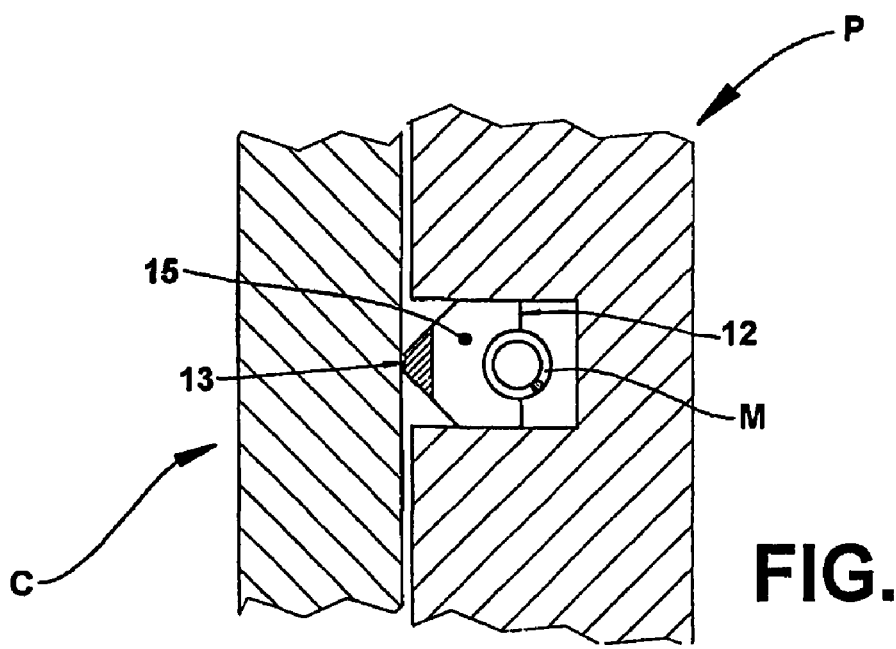
FIG. 3 is a similar view to that of FIG. 2, but taken according to line III-III of FIG. 1 and illustrating the annular body housed in a piston inside a cylinder and receiving a resilient expander in its internal face.
Figure 2:
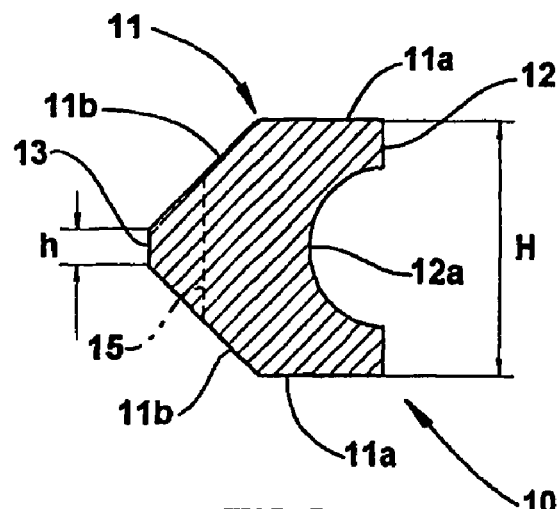
FIG. 2 is an enlarged cross-sectional view of the ring, taken according to line II-II of FIG. 1.

In the embodiment illustrated in FIGS. 1, 2 and 3, the external contact face 13 is cylindrical and generally orthogonal and symmetrical in relation to a plane orthogonal to the axial axis of the annular body 10 and medianly intercepting the latter.

Figure 4:
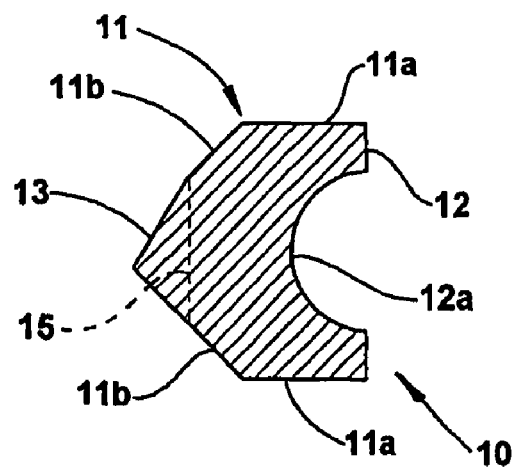
FIGS. 4, 5 and 6 are similar views to that of FIG. 2, but illustrating three possible alternatives for the profile of the external contact face of the annular body.
Figure 5:
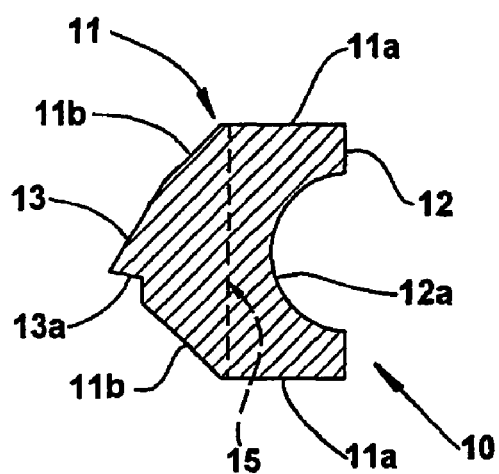
Figure 6:
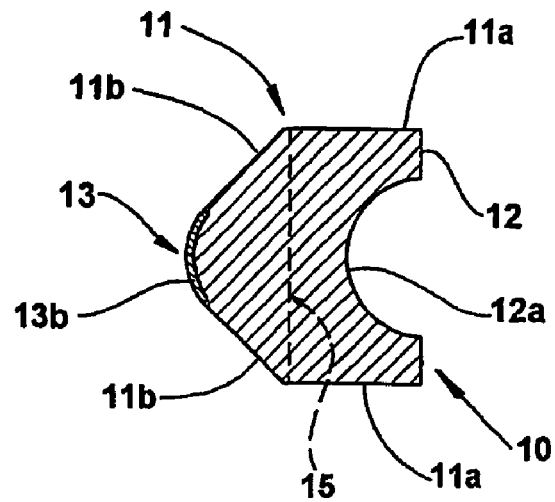

However, the external contact face 13 may be conical, such as illustrated in FIG. 4, and it may further contain, close to its peripheral edge of larger diameter, a lowered step 13a, as illustrated in FIG. 5. Another exemplary embodiment for the external contact face 13 is illustrated in FIG. 6, where said external contact face 13 is defined by a surface having a convex arcuated profile, which can be also symmetrical in relation to said median plane orthogonal to the axial axis of the annular body 10. The annular body 10 can be further provided with channels 15, 16, extended along at least part of the ring hight and which are radially spaced back in relation to the external contact face 13. In the constructions illustrated in FIGS. 1, 2, 3 and 4, the channels 15 provide fluid communication between lateral face portions 11b, which are opposite to each other and spaced from the adjacent walls of the piston P, upon mounting the annular body 10 thereto. This construction of the channels 15 allows the oil to be scraped from the wall of the cylinder C and drained to the crankcase in a freer path. However, it should be understood that channels 15, 16 do not need to provide fluid communication between said opposite lateral face portions 11b of the ring, spaced from the adjacent walls of de piston P, as shown in FIGS. 5, 6, 7 and 8.

Being the annular body 10 provided with the groove 12a in its internal face 12, the channels 15, 16 are opened to the inside of the groove 12a. In the illustrated embodiments, the channels 15, 16 take the form of axial slots opened to the internal face 12 of the annular body 10.

Due to the complexity in the manufacturing of the slots in the axial direction (of the height), the annular body may be produced for example in sintered metallic alloy, thereby achieving the preferred final shape in a more productive and economic way, particularly upon providing the channels 15, 16 in the form of axial slots.

In the embodiment illustrated in FIG. 1, the channels 15 have a rectangular contour which can be obtained, for example, by machining, in the axial direction, the internal face 12 of the annular body 10 to be formed from a blank of adequate material.

Figure 7:
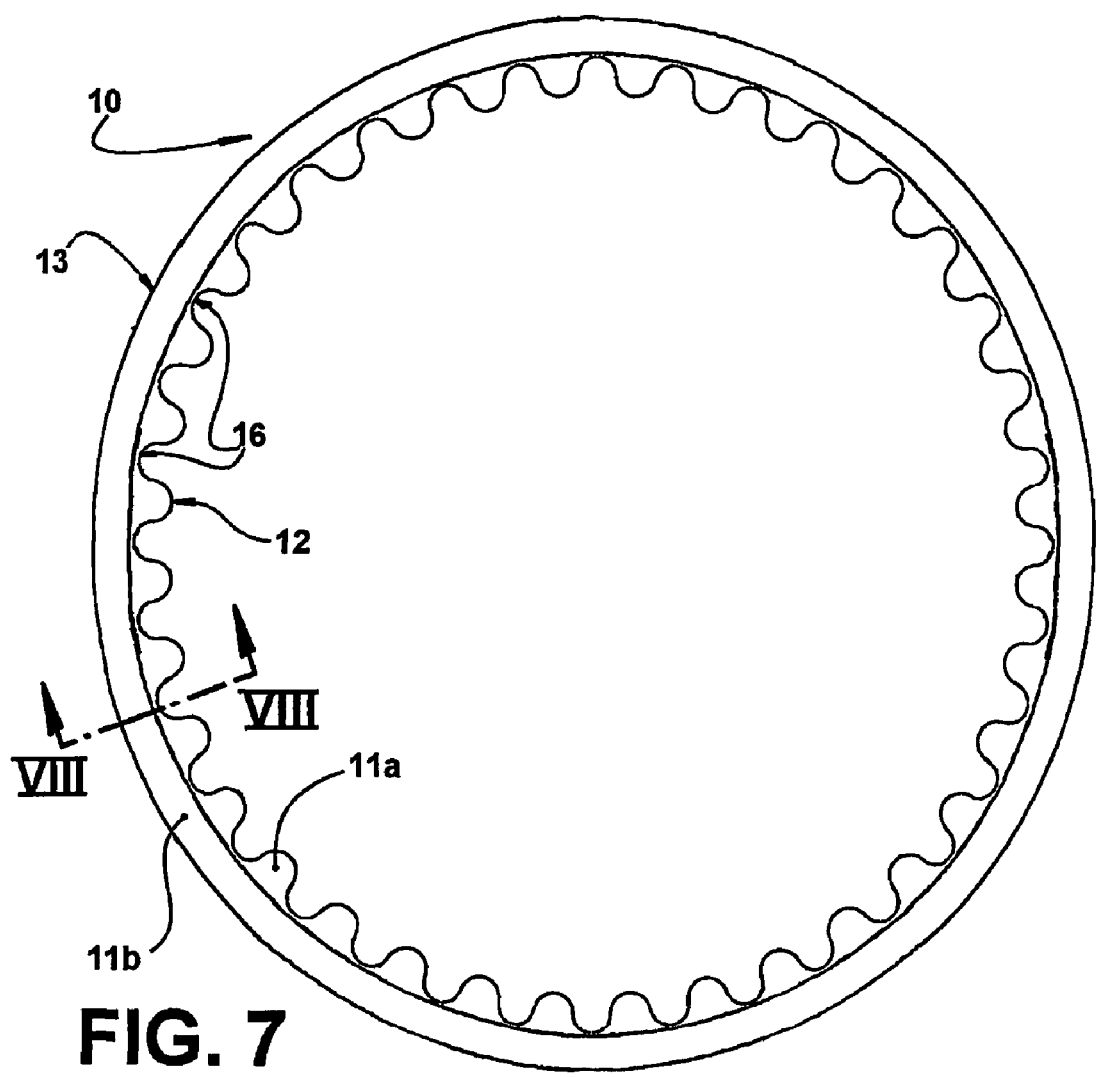
FIG. 7 is a plan view of the oil ring of the present invention, similar to that of FIG. 1, but illustrating another embodiment for the ring.

Also, when the ring is obtained for example by powder metallurgy processing and molded to a form close to its final form, the channels 16 may present the approximate form of an opened and rounded "V", with the external ends of its side walls matching with the adjacent convex portions of the internal face 12 of the annular body 10, making the latter present a sinusoidal inner contour or other combination of tangent curves, as illustrated in FIG. 7.

Figure 8:
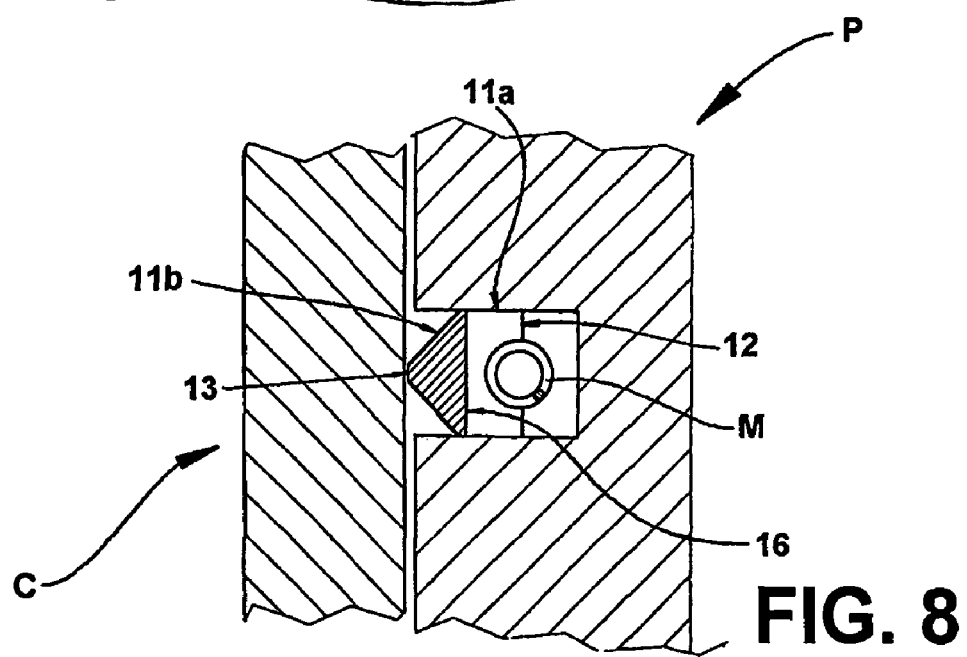
FIG. 8 is an enlarged cross-sectional view of the other embodiment of the ring, taken according to line VIII-VIII of FIG. 7.

The constructive alternative illustrated in FIGS. 7 and 8 uses a shape that is better adapted to the manufacturing process by powder metallurgy, resulting in gains of productivity and quality (for the process), since it reduces (the factor of) stress concentration in relation to the rectangular contour illustrated in FIG. 1 and allows extracting the compacted from the die more efficiently.

Although FIGS. 7 and 8 illustrate the channels 16 with a radial extension insufficient for providing fluid communication between the opposite lateral face portions 11b, spaced from the adjacent walls of the piston P, it should be understood that said channels 16, represented herein in the form of an opened and rounded "V", may be dimensioned for providing said communication according to the form exemplified in FIGS. 1, 2, 3 and 4.

As described above, the channels 15, 16 may be dimensioned with a longer or shorter radial extension, in order to provide communication only between the opposite lateral face portions 11a which are seated against the adjacent walls of the piston groove or also between the opposite lateral face portions 11b of the ring, which are spaced from the adjacent walls of the piston groove. Said channels 15, 16 may present other forms such as trapezoidal, triangular or combinations of tangent curves or others.

It should be understood that the external contact face 13 can be modified by chemical or physical processes or a combination thereof, giving rise to a material layer 13b that is resistant to wear, sticking and friction.

It is a common practice in industries to use transformation of phases, such as in the thermal treatments of quenching and tempering; deposition, whether electrically assisted or not, such as in chrome-plating or nickel-plating; in the physical vapor deposition and in the chemical vapor deposition; in thermal spraying; temperature-assisted diffusion, as in nitriding, carburizing, boronizing, and ferro-oxidizing, in order to achieve the effect of improving resistance to wear, scuffing and friction.

Specific features of the invention are illustrated in the drawings for convenience only, since each feature may be combined with other features in accordance with the invention. Alternative embodiments shall be construed as possible by those skilled in the art, and are intended to be included in the scope of the claims. Thus, the above description is intended to illustrate rather than limit the protective scope of the invention. All obvious alterations and modifications are within the protective scope as defined by the appended claims.

The invention claimed is:

1. An oil ring for an internal combustion engine, comprising a metallic annular body to be mounted around a piston reciprocating inside a cylinder of the engine, said annular body having:
    opposite lateral faces,
    an internal face defining a support for the seating of a resilient expander, and
    an external contact face to be seated against the internal face of the cylinder,
    wherein the external contact face is defined by a single continuous surface extension of the annular body presenting, in the axial direction, a height that is substantially smaller than the height of the internal face,
    wherein each lateral face being defined by at least one lateral face portion that is designed to reduce the moment of inertia of the annular body towards its axis and center of mass,
    wherein the annular body being provided with channels in the form of axial slots radially spaced back in relation to the external contact face, providing fluid communication between lateral face portions that are opposite to each other and being opened to the internal face of the annular body the channels having a contour with the approximate shape of a rounded and opened "V", with the external ends of its lateral walls matching with adjacent convex portions of the internal face of the annular body, giving to the latter a sinusoidal internal contour.

2. The oil ring as set forth in claim 1, wherein the height of the external contact face is at maximum about half the height of the internal face, in order to allow a corresponding reduction in the tangential load exerted by the ring against the cylinder, without negatively altering the specific pressure exerted by the external contact face against the cylinder.

3. The oil ring as set forth in claim 2, wherein the external contact face is cylindrical.

4. The oil ring as set forth in claim 3, wherein the external contact face is symmetrical in relation to a plane that is orthogonal to the axial axis of the annular body and intercepts the latter medianly.

5. The oil ring as set forth in claim 2, wherein the external contact face is defined by a surface with a convex arcuated profile.

6. The oil ring as set forth in claim 5, wherein the external contact face is symmetrical in relation to a plane that is orthogonal to the axial axis of the annular body and intercepts the latter medianly.

7. The oil ring as set forth in claim 2, wherein the external contact face is conical.

8. The oil ring as set forth in claim 7, wherein the external contact face has a lowered step close to its peripheral edge of larger diameter.

9. The oil ring as set forth in claim 2, wherein the annular body is made of a sintered metallic alloy.

10. The oil ring as set forth in claim 2, wherein the external contact face is defined by a film that is made of a material that is resistant to friction, wear and scuffing, provided in the annular body.

11. The oil ring as set forth in claim 1, wherein the external contact face is defined by a surface with a convex arcuated profile.

12. The oil ring as set forth in claim 11, wherein the external contact face is symmetrical in relation to a plane that is orthogonal to the axial axis of the annular body and intercepts the latter medianly.

13. The oil ring as set forth in claim 1, wherein at least one of the lateral faces has at least part of its radial extension defined by a lateral face portion that is designed to reduce the height of the annular body towards the external contact face.

14. The oil ring as set forth in claim 13, wherein both lateral faces are at least partially defined by respective lateral face portions which are mutually convergent towards the external contact face.

15. The oil ring as set forth in claim 1, wherein at least one of the lateral faces is defined by a first lateral face portion, which is orthogonal to the axial axis of the annular body and maintains the height of the latter equal to the height of the internal face, and by a second lateral face portion extending radially outwardly from the first lateral face portion towards the adjacent edge of the external contact face of the annular body.

16. The oil ring as set forth in claim 1, wherein the internal face of the annular body is provided with a circumferential groove that defines the support for the resilient expander, with the channels being opened to the interior of the groove.

17. An oil ring for an internal combustion engine, comprising a metallic annular body to be mounted around a piston reciprocating inside a cylinder of the engine, said annular body having:

an internal face defining a support for the seating of a resilient expander, a cylindrical external contact face to be seated against the internal face of the cylinder defined by a single continuous surface extension of the annular body presenting, in the axial direction, a height that is substantially smaller than the height of the internal face, and opposite lateral faces defined by at least one lateral face portion that is designed to reduce the moment of inertia of the annular body toward its axis and center of mass, the lateral face portion extending radially outwardly, angled towards the external contact face, wherein the annular body is provided with channels in the form of axial slots radially spaced back in relation to the external contact face and extending into the at least one lateral face portion, providing fluid communication between lateral face portions that are opposite to each other and being opened to the internal face of the annular body.

18. The oil ring as set forth in claim 17, wherein the external contact face is symmetrical in relation to a plane that is orthogonal to the axial axis of the annular body and intercepts the latter medianly.

19. The oil ring as set forth in claim 17, wherein the channels have a rectangular contour.

20. The oil ring as set forth in claim 1, wherein the annular body is made of a sintered metallic alloy.

21. The oil ring as set forth in claim 1, wherein the external contact face is defined by a film that is made of a material that is resistant to friction, wear and scuffing, provided in the annular body.

22. An oil ring for an internal combustion engine, comprising a metallic annular body to be mounted around a piston reciprocating inside a cylinder of the engine, said annular body having:

opposite lateral faces, an internal face defining a support for the seating of a resilient expander, and a conical external contact face to be seated against the internal face of the cylinder, wherein the external contact face is defined by a single continuous surface extension of the annular body presenting, in the axial direction, a height that is substantially smaller than the height of the internal face, wherein each lateral face being defined by at least one lateral face portion that is designed to reduce the moment of inertia of the annular body towards its axis and center of mass the lateral face portion extending outwardly and angled towards the external contact face, wherein the annular body being provided with channels in the form of axial slots radially spaced back in relation to the external contact face and extending into the at least one lateral face portion, providing fluid communication between lateral face portions that are opposite to each other and being opened to the internal face of the annular body.

23. The oil ring as set forth in claim 22, wherein the external contact face has a lowered step close to its peripheral edge of larger diameter.

24. The oil ring as set forth in claim 22, wherein the channels have a rectangular contour.

\* \* \* \* \*